United States Patent [19]

Hertz, Jr.

[11] Patent Number: 4,720,113

[45] Date of Patent: Jan. 19, 1988

[54] MULTILAYER, MULTIHARDNESS SEAL

[75] Inventor: Daniel L. Hertz, Jr., Red Bank, N.J.

[73] Assignee: Seals Eastern Inc., Red Bank, N.J.

[21] Appl. No.: 797,901

[22] Filed: Nov. 14, 1985

[51] Int. Cl.$^4$ .............................................. F16J 15/10
[52] U.S. Cl. .................................. 277/165; 277/124; 277/125
[58] Field of Search ............................... 277/123–125, 277/165, 116.2, 116.8, 117–122, 58, 61, 62

[56] References Cited

U.S. PATENT DOCUMENTS

| | | | |
|---|---|---|---|
| 1,964,237 | 6/1934 | Wheeler | 277/124 |
| 2,857,972 | 10/1958 | Baker | 277/116.2 |
| 3,554,563 | 1/1971 | Schumacher et al. | 277/124 |
| 4,161,319 | 7/1979 | Stocking | 277/125 X |
| 4,328,974 | 5/1982 | White et al. | 277/116.2 X |
| 4,433,847 | 2/1984 | Weinberg | 277/125 |
| 4,524,981 | 6/1985 | Hertz | 277/210 |

Primary Examiner—Robert S. Ward
Attorney, Agent, or Firm—Alan H. Levine

[57] ABSTRACT

An annular multilayer seal including a series of more than two successive layers of elastomeric material. The layers vary in hardness in the axial direction of the seal, the outermost layers being the hardest and the innermost layer being the softest. Where the seal has at least five layers, the hardness of each layer between the innermost layer and each outermost layer is about the average of the hardnesses of the innermost and outermost layers. The innermost layer may have a trapezoidal cross-sectional shape, the major base of the trapezoid being at the inside surface of the seal. The thickness of the other layers may vary nonlinearly from the inside surface to the outside surface of the seal. The innermost layer has a Shore Durometer A Scale hardness of between 40 and 75, the outermost layer has a Shore Durometer A Scale hardness of between 70 and 95, and where there are at least five layers, each layer between the innermost layer and one of the outermost layers has a Shore Durometer A Scale hardness of between 70 and 90.

12 Claims, 4 Drawing Figures

MULTILAYER, MULTIHARDNESS SEAL

This invention relates to seals, sometimes called packers, used to provide a fluid tight seal between two annular surfaces.

The invention will be described with reference to a packer used in oilfield equipment. However, it is to be understood that its utility is not so limited. For example, a seal according to the invention could be used in connection with geothermal wells and in other environments requiring annular seals.

In an oilwell installation, a pipe is located coaxially within a tubular casing, the pipe being radially spaced from the casing. The annular space between the pipe and casing is sealed by an annular packer of elastomeric material. The radial thickness of the packer must initially be smaller than the radial dimension of the annular space to be sealed so as to allow the packer to be introduced into that space and moved along the length of the casing and pipe to the point where the seal is to be effected. Therefore, the sealing installation also includes a device for applying an axially compressive load to the ends of the packer. After the packer is in place, it is axially compressed so as to cause it to expand radially and become tightly pressed against both the pipe and casing surfaces.

One way in which these packers fail is that the fluid pressure against which they are sealing causes the packer material to extrude into the gap between the rigid elements of the packer installation which compress the seal and the pipe or casing surface engaged by the seal. Such extrusion can be minimized by using a harder elastomer to form the packer. However, the harder the elastomer, the more difficult it is to compress it so as to cause it expand radially. This problem can be overcome by lengthening the packer, because upon being axially compressed, a longer packer reacts somewhat like a rigid column and buckles. The result is that the packer "barrels" outwardly so that its ends engage the outer surface of the casing. However, a disadvantage of using a longer packer is that it requires the entire sealing tool to be longer thereby making it more expensive. In addition, because of its barrel shape when compressed, only the ends of the packer engage the pipe, and not the entire length of the packer, thereby reducing the effectiveness of the seal.

It is an object of the present invention to provide a seal or packer which is hard enough to effectively resist axial extrusion into the gaps between the packer compressing elements and the casing and pipe surfaces, and yet which is soft enough to be radially expanded in response to axial compression without the need for inordinately lengthening the packer in an axial direction.

It is another object of the invention to provide such a packer formed by multiple layers of elastomeric material, the layers being progressively harder as viewed from the axially innermost layer toward the outermost layers.

It is a further object of the invention to provide such a packer which requires less compressive force to initiate a seal than a substantially comparable packer formed of a single hardness material.

It is an additional object of the invention to provide such a packer which is axially shorter than a packer formed of a single hardness material but which requires the same compressive force to initiate a seal.

It is yet another object of the invention to provide such a packer which, upon being compressed to create a seal, tends to retain a cylindrical inside surface so that it engages the pipe along the entire axial length of its inside surface.

Additional objects and features of the invention will be apparent from the following description, in which reference is made to the accompanying drawings.

Figure 1:
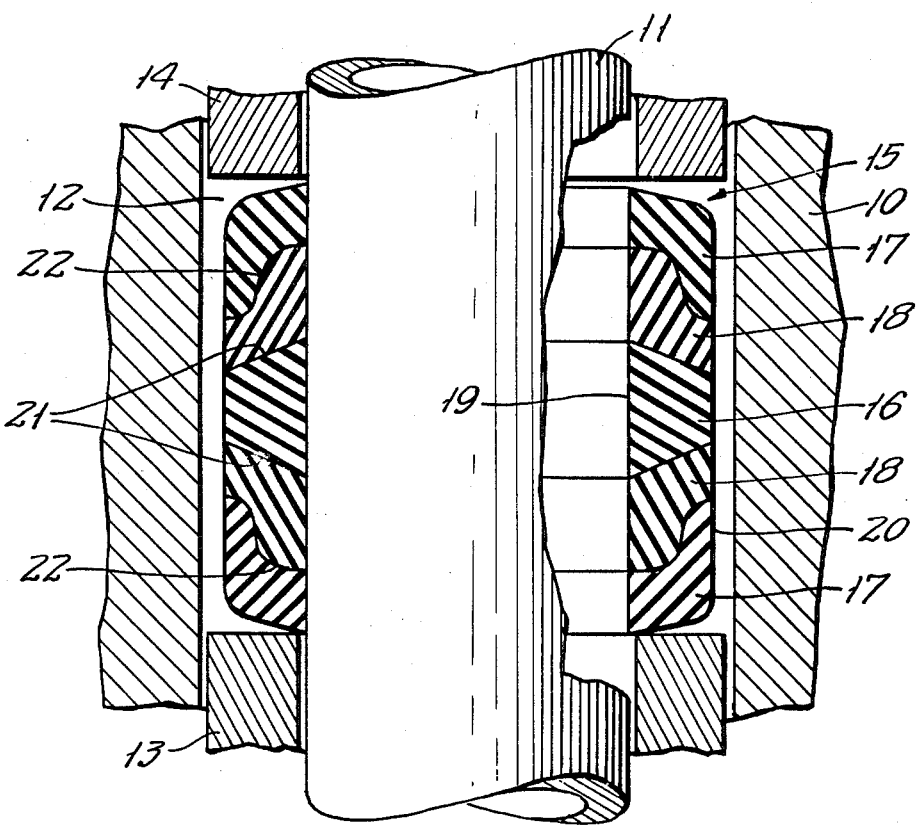
FIG. 1 is a fragmentary vertical cross-sectional view of an oil well installation, showing a packer prior to being axially compressed.

FIG. 1 shows an outer cylindrical casing 10, and a smaller diameter pipe 11 located coaxially within the casing. Arranged within the annular space 12 between the inside surface of casing 10 and the outside surface of pipe 11 is a sealing tool or assembly. The sealing assembly includes a lower compression ring 13, an upper compression ring 14, and a packer 15 between the rings. The sealing assembly also includes conventional mechanism (not shown) by means of which compression rings 13 and 14 can be moved toward and away from each other.

The seal or packer chosen to illustrate the present invention comprises five ring-like layers of elastomeric material permanently joined together to form a unitary packer element. The layers may be of rubber or some other suitable elastomer. The layers include an innermost layer 16, two outermost layers 17, and two intermediate layers 18 between layers 16 and 17. The layers 16–18 may be independent uncured preforms which are machined or molded to the desired shape, after which they are stacked and joined together under heat and pressure.

The packer layers differ from each other in hardness, becoming successively harder from innermost layer 16 to each outermost layer 17. Innermost layer 16 is the least hard, and has a Shore Durometer A Scale (SDA) hardness of between 40 and 75. Intermediate layers 18, which are preferably of equal hardness, are harder than layer 16, having a SDA hardness of between 70 and 90. Outermost layers 17, which are also preferably of equal hardness, are harder than intermediate layers 18, having a SDA hardness between 70 and 95.

The uncompressed cross-sectional shapes of the packer layers are shown in FIG. 1. Layer 16 has a trapezoidal cross-sectional shape, so that it is thicker, in the axial direction of the packer, at the inside surface 19 of the packer than at the outside surface 20 of the packer. The axial direction of the packer is, of course, the direction parallel to the lengths of casing 10 and pipe 11. Each of the layers 18 is thicker, in the axial direction of the packer, at its inside surface than at its outside surface. However, each of the layers 17 is thicker, in the axial direction of the packer, at its outside surface than at its inside surface.

The seams 21 along which layers 18 are joined to layer 16 are straight lines, as viewed in cross-section, which diverge toward the inside surface 19 of the packer. The seams 22 along which layers 18 are jointed to layers 17 are curved, somewhat S-shaped lines, as viewed in cross-section. As a result of the shape of seams 22, the thickness of each layer 17 and 18, in the axial direction of the packer, varies nonlinearly with radial distance from the inside surface 19. It is believed that these crosssectional shapes cause the inside surface 19 of the packer to remain cylindrical, when the packer is axially compressed, while the outside surface expands in a controlled manner from its center toward both of its ends.

Figure 2:
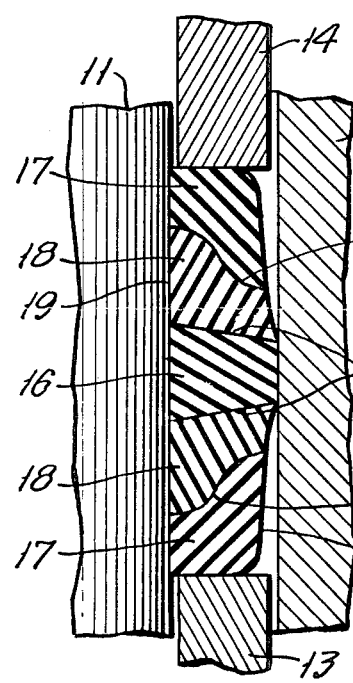
FIG. 2 is a view similar to FIG. 1, but showing only a portion thereof, after the packer has been partially axially compressed.
Figure 3:
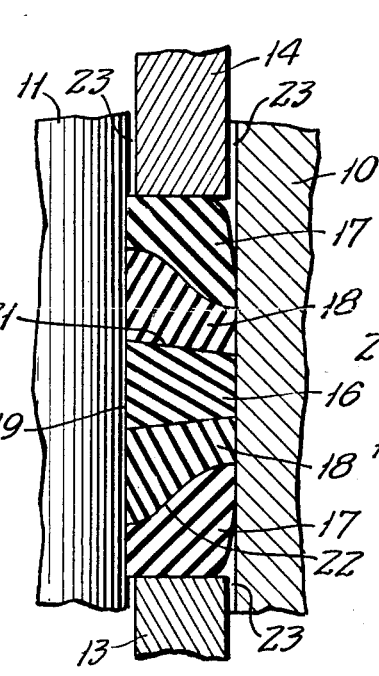
FIG. 3 is a view similar to FIG. 2 after the packer has been fully compressed.

This action of packer 15 can be seen by referring to FIGS. 1-3. In FIG. 1, wherein the packer is not compressed, it fits closely around pipe 11, but not so tightly as to prevent the packer from being moved axially along the pipe to the point where the seal is to be effected. In this position, the outside face 20 of the packer is radially spaced from casing 10. As compression rings 13 and 14 are moved toward each other, they begin to compress the packer (FIG. 2). Innermost layer 16, being the least hard layer, is the first to be squeezed radially outwardly into engagement with the inner surface of casing 10. At the same time, seams 21 diverge from each other at a smaller angle, and seams 22 are slightly straightened.

After continued movement of rings 13 and 14 toward each other to their final, seal-creating position (FIG. 3), intermediate layers 18 have been squeezed radially outwardly to engage casing 10. Also, outermost layers 17 have, to a lesser extent, been squeezed outwardly so that a portion of each of those layers engages casing 10. The seams 21 diverge at yet a smaller angle, and seams 22 have been further straightened. Note that inside wall 19 of the packer has not bent away, or barreled, from pipe 11, so that substantially the entire surface of wall 19 remains in contact with the pipe to insure a good seal between the packer and pipe.

Due to the presence of hard layers 17, any tendency of the packer to extrude into the annular spaces 23 between rings 13 and 14, on the one hand, and casing 10 and pipe 11, on the other, is greatly minimized or eliminated. At the same time, the less hard layers 16 and 17 permit the packer to be squeezed radially outwardly without the need to make the packer as long as it would have to be if formed entirely of a single material having the hardness of layers 17. If the packer is longer, the entire sealing tool must be longer, thereby adding considerably to its cost.

Theoretically, a packer according to this invention could have just three layers, namely, a relatively soft innermost layer and two harder outermost layers. However, if the difference in hardness is too great between the innermost layer and each outermost layer, the strain created along the seams between the layers when the packer is compressed and in use could damage the packer. Therefore, as a practical matter a minimum of five layers is preferred since the presence of the two intermediate layers 18 minimizes the strains at the seams 21 and 22.

Figure 4:
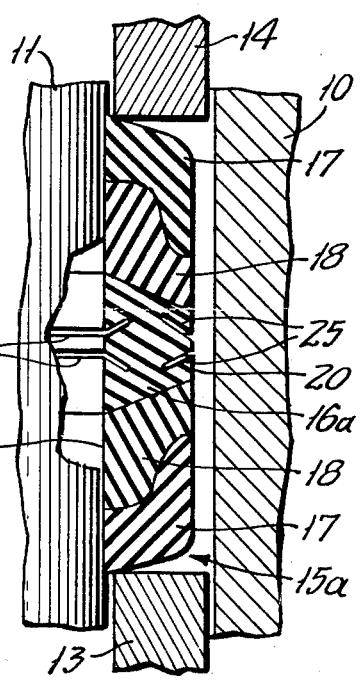
FIG. 4 is a view similar to FIG. 2 showing an alternative embodiment of the invention.

The embodiment of the invention shown in FIG. 4 is identical to that of FIGS. 1-3, except that the innermost layer 16a of packer 15a is formed with a pair of grooves 25 in its inside and outside faces 19 and 20. As fully described in U.S. Pat. No. 4,524,981, these grooves can be helpful in transforming the compression type seal into a lip type seal in case of stress relaxation of the elastomeric material of which the packer is formed.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An annular multilayer seal comprising a series of at least five layers of elastomeric material, the innermost layer being the softest, each of the two outermost layers being harder than the innermost layer, and each layer between the innermost layer and each outermost layer being harder than the innermost layer and softer than its respective outermost layer.

2. An annular multilayer seal as defined in claim 1 wherein the hardness of each layer between the innermost layer and each outermost layer is about the average of the hardnesses of the innermost layer and its respective outermost layer.

3. An annular multilayer seal as defined in claim 1 wherein the radially inner and outer surfaces of the innermost layers are each formed with a pair of annular grooves, each groove when viewed in radial cross-section forming an acute angle with the surface in which it is located, and when viewed in radial cross-section, the pair of grooves in each surface converging toward that surface.

4. An annular multilayer seal as defined in claim 1 wherein the innermost layer is thicker, in the axial direction of the seal, at the inside surface of the seal than at the outside surface of the seal.

5. An annular multilayer seal as defined in claim 4 wherein the innermost layer has a trapezoidal cross-sectional shape.

6. An annular multilayer seal as defined in claim 1 including at least five layers, and wherein each layer intermediate the innermost layer and one of the outermost layers is thicker, in the axial direction of the seal, at the inside surface of the seal than at the outside surface of the seal.

7. An annular multilayer seal as defined in claim 6 wherein the thickness of each intermediate layer, in the axial direction of the seal, varies nonlinearly with distance from the inside surface of the seal.

8. An annular multilayer seal as defined in claim 1 wherein the innermost layer has a Shore Durometer A Scale hardness of between 40 and 75, and each outermost layer has a Shore Durometer A Scale hardness of between 70 and 95.

9. An annular multilayer seal as defined in claim 8 including at least five layers, each layer intermediate the innermost layer and one of the outermost layers having a Shore Durometer A Scale hardness of between 70 and 90.

10. An annular multilayer seal as defined in claim 1 wherein the hardnesses of the two outermost layers are equal.

11. An annular multilayer seal as defined in claim 1 including five layers, the harnesses of the two layers between the innermost layer and the two outermost layers are equal.

12. An annular multilayer seal comprising a series of more than two successive layers of elastomeric material, the layers varying in hardness in the axial direction of the seal, the outermost layers being the hardest and the innermost layers being the softest, each outermost layer being thicker, in the axial direction of the seal, at the outside surface of the seal than at the inside surface of the seal, the thickness of each outermost layer, in the axial direction of the seal, varying nonlinearly with radial distance from the inside surface of the seal.

* * * * *